United States Patent
Gardiner et al.

(10) Patent No.: US 8,140,684 B2
(45) Date of Patent: Mar. 20, 2012

(54) VOICE ACTIVATED SYSTEM FOR DYNAMICALLY RE-CONNECTING USER COMPUTER OPERATION SESSIONS

(75) Inventors: Jeffrey Gardiner, Phoenixville, PA (US); Domonic Snyder, Whitehall, PA (US); Christopher Gardner, Charlotte, NC (US); William Boggs, Acworth, GA (US); James Giancarlo, Phoenixville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1309 days.

(21) Appl. No.: 11/564,448

(22) Filed: Nov. 29, 2006

(65) Prior Publication Data

US 2007/0269037 A1 Nov. 22, 2007

Related U.S. Application Data

(63) Continuation-in-part of application No. 10/852,885, filed on May 25, 2004, now abandoned.

(60) Provisional application No. 60/545,802, filed on Feb. 19, 2004, provisional application No. 60/772,241, filed on Feb. 10, 2006.

(51) Int. Cl.
*G06F 15/173* (2006.01)
*G06F 15/177* (2006.01)
*G06F 15/16* (2006.01)

(52) U.S. Cl. ...... 709/227; 709/203; 709/217; 704/270.1
(58) Field of Classification Search .......... 709/203, 709/227; 704/270.1
See application file for complete search history.

(56) References Cited

U.S. PATENT DOCUMENTS

| | | | |
|---|---|---|---|
| 5,581,753 A | 12/1996 | Terry et al. | |
| 6,058,381 A | 5/2000 | Nelson | |
| 6,477,487 B1 | 11/2002 | Packer | |
| 6,832,255 B1 * | 12/2004 | Rumsewicz et al. | 709/227 |
| 7,028,073 B1 * | 4/2006 | Bui et al. | 709/203 |
| 2002/0065912 A1 | 5/2002 | Catchpole et al. | |
| 2003/0187991 A1 | 10/2003 | Lin et al. | |
| 2004/0172254 A1 * | 9/2004 | Sharma et al. | 704/270.1 |

\* cited by examiner

*Primary Examiner* — Haresh N Patel
(74) *Attorney, Agent, or Firm* — Alexander J Burke

(57) ABSTRACT

A system enables clinicians to use naturally spoken voice commands from a small, wearable, wireless badge (or other portable device) to trigger events including, application session transfer, wireless communications (such as voice calls) and control of electronic devices. A system for managing user operation sessions on multiple servers includes an interface for receiving, from a first workstation, a request to initiate a current session of operation of a particular executable application on a first server and user identification information from a particular user. A session processor, in response to the received particular user identification information, identifies an active session of operation of the particular user on a second server previously initiated via a second workstation and re-attaches connection of the previously initiated active session of operation to the first workstation as the current session in response to a user voice command.

15 Claims, 4 Drawing Sheets

VOICE ACTIVATED SYSTEM FOR DYNAMICALLY RE-CONNECTING USER COMPUTER OPERATION SESSIONS

This is a Continuation-in-part application of non-provisional application Ser. No. 10/852,885 filed May 25, 2004 which is based on provisional application Ser. No. 60/545,802 by D. Snyder filed Feb. 19, 2004 and also claims priority of provisional application Ser. No. 60/772,241 by J. Gardiner filed Feb. 10, 2006.

FIELD OF THE INVENTION

This invention concerns a voice activated system for managing user identification, login and user operation sessions on one or more servers to reduce manual contact, redundant sessions and improve security.

BACKGROUND OF THE INVENTION

Existing workstations require physical contact to transfer a session of user operation of a computer or workstation. A user needs to identify himself before assuming control of a workstation and in order to log in to associated networked devices requiring user authentication. The human physical contact required facilitates germ transmission which is of substantial detriment in hospitals and other facilities where there is an elevated risk of spread of bacteria, viruses, microbes etc. A user typically gains control of a workstation by entering identification information via physically attached input device (such as a keyboard, mouse, card reader, etc.). This increases the opportunity for a workstation (e.g. a terminal) to be used for unauthorized purposes. Terminals occupy substantial space so typically cannot be conveniently mounted on walls because of the need for a physically attached input device. Further, a user may connect to different applications executing on the same or different servers from one or more workstations at different locations. If a user roams from one location to another in this manner without properly disconnecting a session of operation, the session remains "active".

In existing systems, when a user connects to a server from a new location, a new session is created even though there is a concurrent previously created operation session. The reason for this is that the previously created session is in an "active" rather than "disconnected" state. Therefore there are two "active" sessions associated with the user. If this goes on repeatedly a user will create many concurrent "active" sessions of computer operation. This is undesirable because multiple sessions consume server resources and represent a potential security problem particularly as a session may leave confidential patient medical information available for unauthorized access. Also, a user that initiates a second concurrent session may need to engage in burdensome navigation to return to a previous position achieved in a first session to continue work tasks using an application. A system according to invention principles addresses these problems and related problems.

SUMMARY OF THE INVENTION

A system enables clinicians to use naturally spoken voice commands from a small, wearable, wireless badge (or other portable device) to initiate automatic re-direction of an application session that is actively connected to a device and transfer it to a different device and to make other wireless communications (such as voice calls) and enable control of electronic devices. A system for managing user operation sessions on multiple servers includes an interface for receiving, from a first workstation, a request to initiate a current session of operation of a particular executable application on a first server and user identification information from a particular user. A session processor, in response to the received particular user identification information, identifies an active session of operation of the particular user on a second server previously initiated via a second workstation and re-attaches connection of the previously initiated active session of operation to the first workstation as the current session in response to a user voice command.

DETAILED DESCRIPTION OF INVENTION

Figure 1:
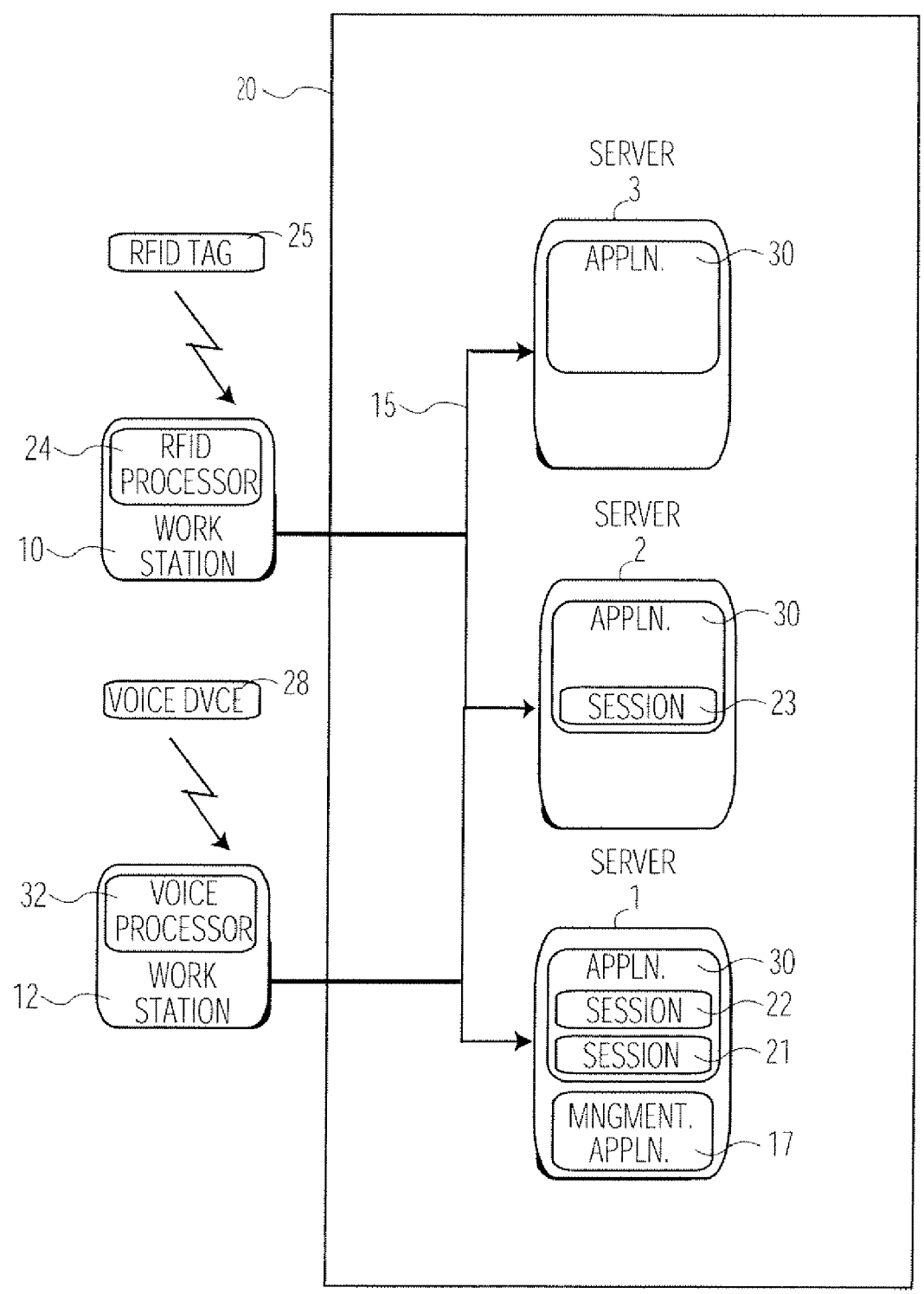
FIG. 1 shows a block diagram of a system enabling a clinician to use naturally spoken voice commands to trigger events including, application session transfer, wireless communications (such as voice calls) and control of electronic devices, according to invention principles.

FIG. 1 shows a block diagram of a system 100 enabling a clinician to use naturally spoken voice commands to trigger events including, application session transfer, wireless communications (such as voice calls) and control of electronic devices. System 100 enables clinicians to use naturally spoken voice commands from a small, wearable, wireless voice device (e.g., a badge) to transfer an application session from one device to another. The wireless voice device accepts voice commands from a wearer and transmits them to server 20. Server 20 reacts to the voice commands by triggering events including, initiating automatic re-direction of an application session that is actively connected to a device and transferring it to a different device, making other wireless communications (such as voice calls) and enabling control of electronic devices. A user initially logs onto server 20 via voice commands and subsequent commands are recognized as originating from the logged on user. The wireless voice device also supports wireless communications (such as voice calls) and is used to control electronic devices. System 100, in response to command via a wireless voice device, automatically seizes a session that is actively connected to a device and attaches it to a different device. A session of operation, as used herein, includes a session of operation of an executable application or procedure or a session of operation of a processing device such as a workstation, PC, server, microprocessor, controller or portable processing device. As used herein, a "disconnected session" is an "orphaned" session having no client work stations connected with the session and an "active session" is a user session that does have a client work station connected with the session.

Existing systems fail to comprehensively address voice controlled session management in an environment in which a user creates a new session and has a previously created "active session". One known system reconnects a current user workstation to a previous "disconnected session" if a user logs on and connects to a server and a previously disconnected session initiated by the user exists. However, known systems fail to manage reconnection in the event that a user has a previous "active session" of operation. A system, according to invention principles, manages user operation sessions on a plurality of servers and enables users of a server (such as Citrix's current MetaFrame products (v1.8 and XP), for example) to seize a session that is actively connected to another device and attach it to a different device in response to voice command.

The system allows a user (such as a physician) to roam from one location to another (home to office; patient room to patient room; etc.) and have an active session follow the user in response to user voice command, for example. The session returns to a position in an application (such as a particular displayed image) where a user left off at a previous location. The system addresses the situation where a user creates and abandons one or more active sessions throughout the course of a day, for example. The system advantageously eliminates physical human contact and transfer of germs, bacteria etc in transferring an application session and reduces server overhead employed by roaming users by eliminating multiple sessions per user and improves security by eliminating abandoned sessions. The voice command functions also may be advantageously used where a user's hands may be occupied such as during surgery, during operation of a device or during administration of a treatment, for example. The system also advantageously eliminates the need for a user to reestablish a session from scratch when an active session already exists elsewhere in a group of servers, for example.

An executable application as used herein comprises code or machine readable instruction for implementing predetermined functions including those of an operating system, healthcare information system or other information processing system, for example, in response to user command or input. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A workstation comprises a terminal, display, PC, portable processing device or phone, for example and a server as used herein comprises a processing device, PC, laptop, notebook, PDA (Personal Digital Assistant, phone or other device.

In the FIG. 1 system, workstations 10 and 12 bidirectionally communicate on network 15 with a group of servers 20 (e.g., a Citrix compatible, or other server farm) including servers 1, 2 and 3. A user establishes a first (Primary) session of operation 21 of executable application 30 on server 1 of group of servers 20 following logon and entry of user identification information by voice commands using wireless voice device 28, voice command processor 32 and workstation 12 and authentication of the entered user identification information. The user voice commands identify workstation 12 and the user.

In another embodiment voice processor 28 may reside in servers 20 or on any device on network 15. Workstations 10 and 12 may contain either or both a voice command processor (e.g., processor 32) and an RFID processor (e.g., processor 24). This first session 21 is a Primary session of operation meaning the first session established by the user on server group 20. A Primary session is a semi-permanent session that is dragged from workstation to workstation as the user roams around a hospital or office, for example. Subsequently, a user starts to initiate a second (Attached) session of operation of executable application 30 via workstation 10. An Attached session is one currently displayed on a user's workstation. The Primary and Attached sessions may or may not be the same session. An executable procedure (such as a Script) is executed on server 1 (or another server or on a workstation in another embodiment) to advantageously make Primary and Attached sessions of operation one and the same sessions if they are initially different separate sessions. That is, if the session Attached to a user's workstation is not the Primary session of operation, an executable application 17 procedure is executed on server 1 to make them a single Primary session of operation and to eliminate other sessions. Individual servers of group 20 include an interface for bidirectionally communicating with workstations 10 and 12 and for receiving requests to initiate a current session of operation of a particular executable application as well as for receiving user identification information from a particular user.

A user that logs on to initiate a session of operation on a server of server group 20 for a first time and for which no orphaned sessions (active or disconnected) exist anywhere in group 20, initiates execution of a script procedure which creates a Primary session of operation of an executable application on the server connected to the current user workstation. Application 17 enables a session to follow the user as the user roams from PC to PC whilst supporting load balancing among the servers of group 20 to distribute user load relatively evenly across the servers of group 20. A user that logs on and re-connects to server group 20 and for which an existing Primary session in a disconnected state exists on one of the servers of group 20, initiates re-connection of a current workstation to the server running the previous disconnected session.

In one scenario, a second (Attached) session of operation of executable application 30 on server 1 that is initiated by the user via workstation 10, coincidentally re-connects to server 1 of server group 20. Therefore both the first (Primary) session of operation 21 of executable application 30 which is still active and the second (Attached) session of operation 22 of application 30 of the user, are connected to the same server (server 1). Session management application 17 including a script procedure (e.g., a session processor compatible with a Citrix server product or other proprietary server management system, for example) executes on server 1 (or another server or on a workstation in another embodiment). The script procedure of application 17 executes in response to user logon to initiate a session of operation of application 30 and entry of user identification information via a workstation.

The script procedure of application 17 makes Primary and Attached sessions of operation one and the same sessions if they are initially different separate sessions. Specifically, in response to the user's second login via workstation 10, the application 17 script procedure initiates a search of session tracking information maintained on server 1. The search identifies the active first (Primary) session of operation 21 of executable application 30 on server 1 that was previously initiated via workstation 12 and is associated with the user. The search of session tracking information maintained on server 1 is performed in response to received user identification information via voice command device 28. The session tracking information is maintained on server 1 for the servers of group 20 and indicates active and disconnected sessions for different users and different applications for sessions of operation supported by the servers of group 20.

In another embodiment, the session tracking information may be maintained in another server of group 20 in a central repository or within multiple locations (e.g., by individual servers of group 20) or in another processing device such as a workstation connected to network 15. In a further embodiment, the application 17 script procedure may acquire session tracking information by deriving and compiling session tracking information from session associated status information acquired from one or more session manager applications (such as application 17) employed by server group 20. The status information indicates operation sessions still present on an individual server and is acquired by interrogating session operation history information retained by an individual server, for example. A session manager application manages opening of sessions and generation of unique session identifiers and associated user authentication operations for individual sessions supported by servers of group 20.

The application 17 script procedure identifies the active first (Primary) session of operation 21 of executable application 30 on server 1 that was previously initiated by the user via a workstation 12. This is done through search of session tracking information maintained on server 1 indicating operation sessions still present on server 1 that are associated with the previously entered user identification. The application 17 script procedure detaches the connection between workstation 12 and the active first (Primary) session of operation 21 of application 30 on server 1 by one or more of, disabling a communication link, disabling an association or mapping supporting communication and disabling a link supporting communication.

The application 17 script procedure re-attaches the connection of the detached active first (Primary) session of operation 21 to workstation 10 as the current second (Attached) session of operation 22 of executable application 30 without requiring re-authentication of received user identification information. In one Citrix server management system compatible embodiment, the application 17 script procedure automatically initiates a Citrix server pass-through client on the server running the current second (Attached) session 22. The Citrix server pass-through client re-attaches the connection of the detached active first (Primary) session of operation to workstation 10 as the current second (Attached) session without requiring a user to re-authenticate during the second connection. The re-attached session of operation continues at a position in an executable application comprising the active first (Primary) session of operation 21 where the user discontinued using this executable application. The application 17 script procedure re-attaches the connection by one or more of, enabling a communication link, establishing an association or mapping supporting communication and establishing a link supporting communication. The application 17 script procedure terminates sessions of operation on server 1 that are associated with the user, other than the re-attached detached active first (Primary) session of operation.

A user wearing voice device 28 and roaming within a predetermined distance of workstation 12 (four feet, for example) provides commands via voice command processor 32. Thereby a user may verbally communicate user identification information, or information enabling derivation of user identification, to log-on to applications operating on workstation 12. Similarly, REID tag 25 activates an RFID sensor in RFID processor 24 in workstation 10. The RFID tag conveys user identification information, or information enabling derivation of user identification, to RFID processor 24. Thereby, REID processor 24 enables a user to automatically log-on to workstation 10 without entering a password or userid in response to proximity detection by workstation 10. The REID tag may itself incorporate, in one embodiment, a biometric sensor so that it is may be activated by a particular user. RFID detection and processing units 24, 25 may be employed in conjunction with voice command processing units 28, 32 which in one embodiment may be a composite system involving use of a composite wearable voice/RFID device. In response to detection of a voice command from voice device 28, voice command processor 32 using workstation 12 and application 17, automatically initiates transfer of a user Primary (active or disconnected) session involving one or more executable applications from another workstation at a different location to workstation 12 ready for access by the user. For this purpose workstation 12 includes an interface for generating a request message for communication to a remote server (e.g., server 1) for initiating a current session of operation of a particular executable application on workstation 12 (a processing device) by transferring an identified session of operation of the user previously initiated via workstation 10 to workstation 12 as the current session of operation. A processing device as used herein comprises a workstation, PC, laptop, notebook, PDA (Personal Digital Assistant, phone or other device. When the user leaves the vicinity of workstation 12, application 17 suspends and secures the initiated session ready for re-activation or movement to another workstation and location.

In a further scenario, a user establishes a first (Primary) session of operation 21 of executable application 30 on server 1 of group of servers 20 following voice activated logon and entry of user identification information via workstation 12 and authentication of the entered user identification information. Another (Attached) session of operation of executable application 30 (session 23) on server 2 of server group 20 is initiated by the user via workstation 10. The first (Primary) session of operation 21 of executable application 30 which is still active and (Attached) session 23 of operation of application 30 of the user, are connected to different servers, server 1 and server 2 respectively. In response to the user's second login via workstation 10, the application 17 script procedure initiates a search of session tracking information for the servers of group 20 maintained on server 1 (or on another server or distributed among the servers of group 20).

The application 17 script procedure search identifies the active first (Primary) session of operation 21 of executable application 30 on server 1 associated with the user that was previously initiated by the user via workstation 12. The search comprises a search of session tracking information maintained on server 1. The application 17 script procedure detaches the connection between workstation 12 and the active first (Primary) session of operation 21 of application 30 on server 1 and re-attaches the connection of the detached active first (Primary) session of operation to workstation 10 as the current second (Attached) session of operation 23 of executable application 30. The application 17 script procedure terminates sessions of operation that are associated with the user and are present on servers of group 20, other than the re-attached detached active first (Primary) session of operation. The system of FIG. 1 allows load balancing to be performed on the servers of group 20 as normal.

Figure 4:
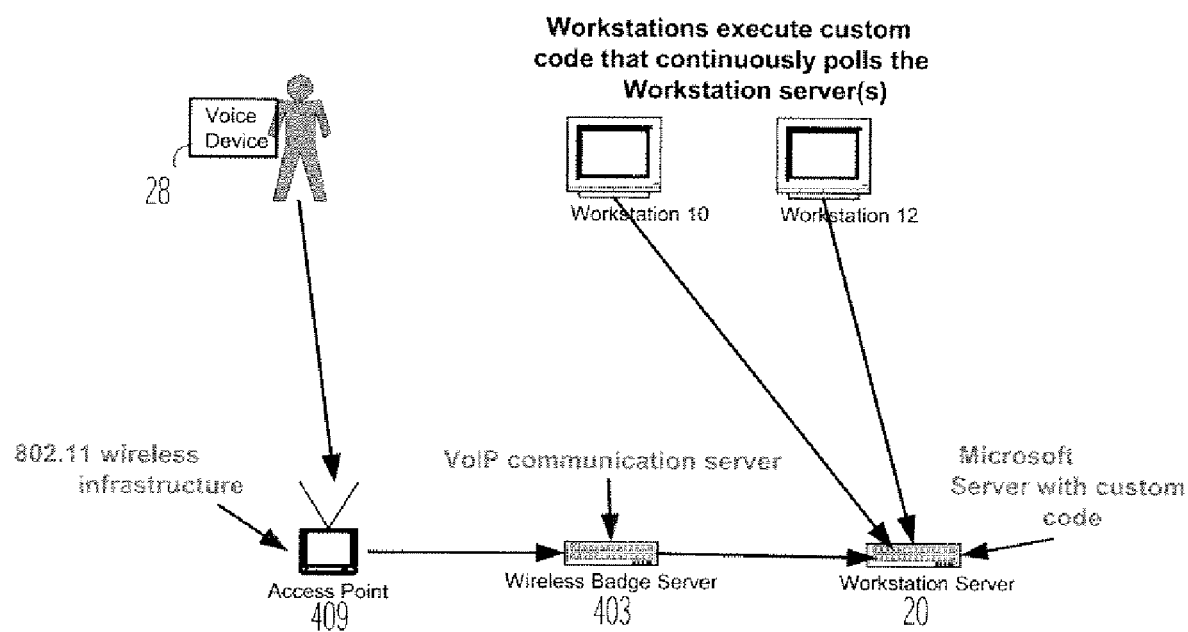
FIG. 4 shows a diagram of another embodiment of a system enabling a clinician to use naturally spoken voice commands to trigger events including, application session transfer, wireless communications (such as voice calls, login, workstation selection) and control of electronic devices, according to invention principles.

FIG. 4 shows a diagram of another embodiment of a system enabling a clinician to use naturally spoken voice commands to trigger events including, application session transfer, wireless communications (such as voice calls, login, workstation selection) and control of electronic devices. In response to a voice command, a user moves a workstation session of operation to a different workstation. Workstations may be in separate physical locations within a facility, such as rooms within a hospital. The system enables computer workstations in public areas to be functional without dedicated physical input devices (keyboard, mouse, touch screen, etc.) thereby increasing security (unauthorized users have no way to supply input). The system eliminates transfer of germs as a consequence of sharing input devices since each user has a personal wireless voice device 28 (e.g., a badge) and there is no shared input device. The system my also save physical space because attached input devices are not required and workstations may be wall mounted, for example. A workstation automatically disconnects a session after a user configurable number of minutes without communication from user voice device 28. This ensures confidential information is not displayed indefinitely.

A particular user is pre-identified during an initial particular voice device 28 login. Subsequent communication from the particular voice device 28 is associated with the particular user. The first time a user logs on to voice device 28, device 28 transfers credentials to any configured device. The user is not required to log on to each device independently. In the system of FIG. 4, the first time a user establishes a server based session on servers 20 from any device, the user presses a button on wireless voice device 28 to initiate communication of a message to (get attention of) Voice Server 403 via an IEEE 802.11 protocol compatible access communication point 409. Voice Server 403 is a Voice over Internet Protocol (VOIP) compatible communication server. Voice Server 403 acknowledges the received message by bidirectionally communicating with voice device 28 to request a user name. The user speaks his name into voice device 28 which initiates communication of data representing the name to Voice Server 403 which acknowledges the message and logs the user on. After this initialization, the user may speak the name of any particular preconfigured workstation (e.g., workstation 10 or 12) or the user's own name to transfer an existing session to a particular workstation in the vicinity of the user. The vicinity of a user or mobile workstation is determined based on predetermined fixed location workstation location information and on user location information derived from GPS, RFID, RF, infra red or other location processing system that is communicated using 802.11 protocol. The system combines wireless voice commands to transfer user sessions between workstation devices to expedite access and reduce contamination of hands and equipment to improve clinician workflow. The system is usable in any setting where similar needs exist. The system is of particular use by a clinician in an acute care facility where speed, security and cleanliness are vital.

Figure 2:
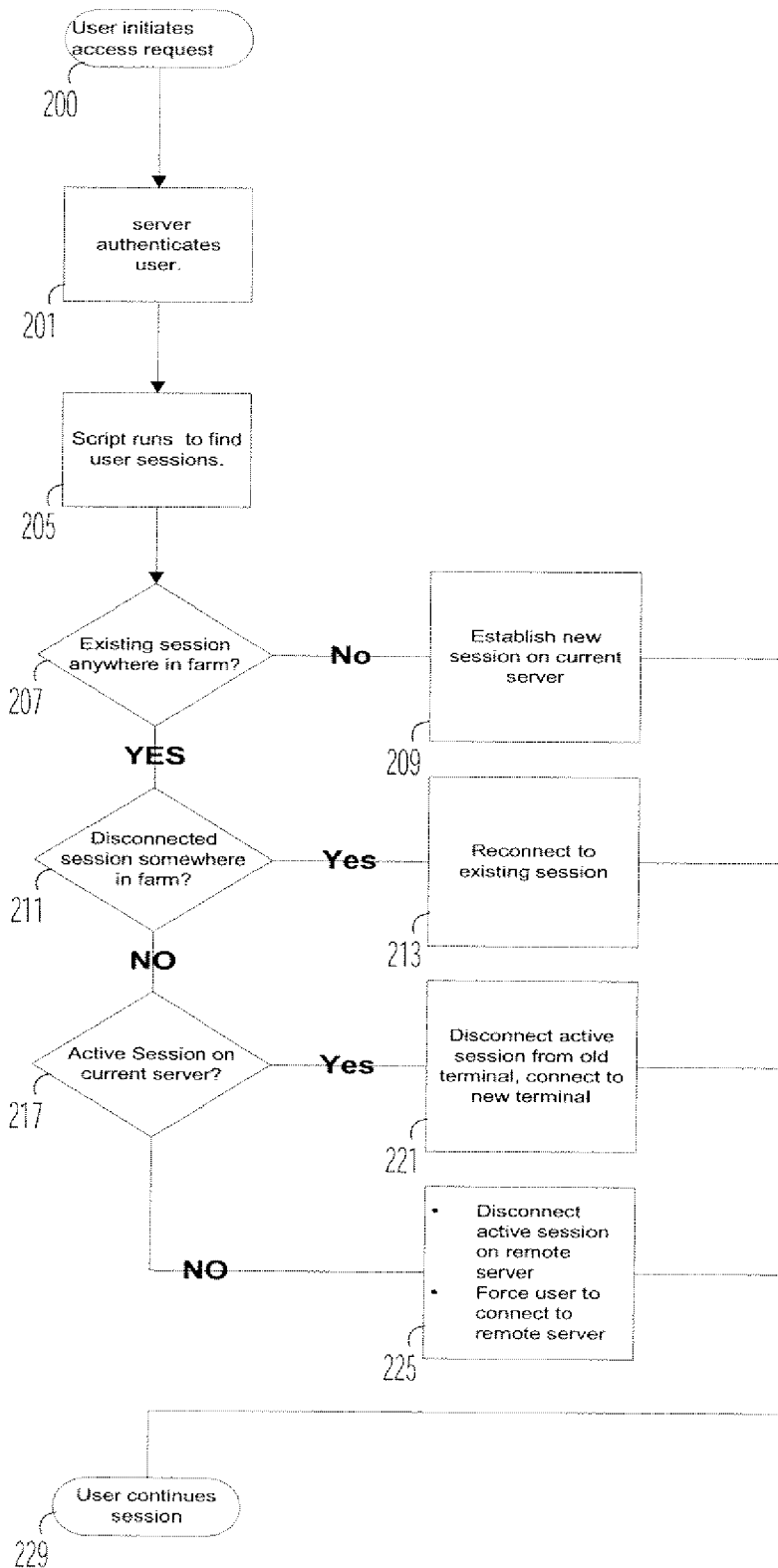
FIG. 2 shows a flowchart of a process used in the system of FIG. 1 for voice controlled management of user operation sessions on one or more different servers, according to invention principles.

FIG. 2 shows a flowchart of a process used in the system of FIG. 1 for managing user operation sessions on one or more different servers. In response to a user initiating a voice command, via units 28 and 32, to request access to an application and receiving user identification information in step 200, an authentication procedure (such as a Citrix compatible procedure) executes in step 201 to determine whether the user is authorized to access the requested application. In step 205, the application 17 script procedure executes to interrogate servers of group 20 to determine if the user has any other existing sessions in server group 20. If the application 17 script procedure determines in step 207 that there are no other sessions anywhere in server group 20 for this user, a new session of operation is created on the current server in step 209 and the user continues with the created session in step 229. If the application 17 script procedure determines in step 207 that there is at least one other session for this user on a server in server group 20, the script procedure determines in step 211 whether there is a disconnected session for this user on a server in server group 20. In response to detection of a disconnected session in step 211, the application 17 script procedure in step 213 re-attaches connection to the disconnected session and the user continues with this session in step 229.

If the application 17 script procedure determines in step 211 that there is no disconnected session for this user on a server in server group 20, the script procedure determines in step 217 whether there is an active session for this user on a current server (of server group 20) to which a user workstation is connected. A current server is a server to which a workstation currently employed by a user is connected. In response to detection in step 217 of an active session on a current server (of server group 20) to which a previously employed user workstation is connected, the application 17 script procedure in step 221 detaches the connection between the active session on the current server and the previously employed workstation to which it is connected. The application 17 script procedure re-attaches connection of a workstation currently employed by the user to the now disconnected active session on the current server and the user continues with this session in step 229. In response to no active session being detected on a current server (of server group 20) in step 217, the application 17 script procedure in step 225 detaches a connection between an active session on a remote (non-current) server and a workstation previously employed by the user to which the session is connected. The application 17 script procedure re-attaches connection of a workstation currently employed by the user to the now disconnected active session on the remote server and the user continues with this session in step 229.

Figure 3:
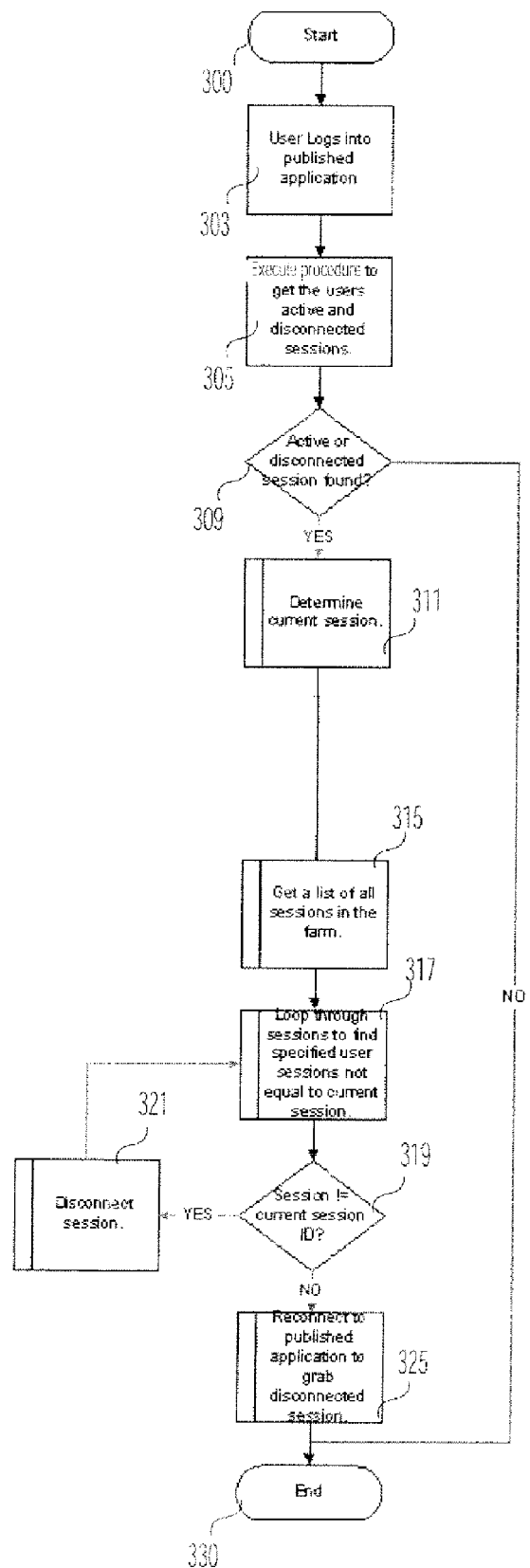
FIG. 3 shows a flowchart of a voice controlled process used to identify and re-connect to previous user operation sessions, according to invention principles.

FIG. 3 shows a flowchart of a process used in the system of FIG. 1 to identify and re-connect to previous user operation sessions. A user via voice command and units 28 and 32, logs on to an executable application such as application 30 (FIG. 1) in step 303, following the start at step 300. In step 305 in response to user logon, a script procedure such as the application 17 script procedure executes to identify active and disconnected sessions of operation of the user present on servers in server group 20. If the application 17 script procedure determines in step 309 that there are no active or disconnected sessions of operation of the user present on servers in server group 20, the process terminates at step 330. If the application 17 script procedure determines in step 309 that there are active or disconnected sessions of operation of the user present on servers in server group 20, the application 17 script procedure obtains a session identifier of a current session of operation of an application in step 311. The current session is hosted by a current server to which a workstation currently employed by a user is connected.

The application 17 script procedure in step 315 obtains data identifying the sessions of operation present on the servers of group 20. In steps 317, 319 and 321 the application 17 script procedure disconnects the sessions identified in step 315 having session identifiers different to the session identifier of the current session previously obtained in step 311. The sessions disconnected in steps 317, 319 and 321 are disconnected without user performance of a workstation logout function. The application 17 script procedure in step 325 re-attaches the connection of a session of operation disconnected in step 321 to the current user workstation in response to user logon in step 303. The process of FIG. 3 terminates at step 330.

The systems and processes presented in FIGS. 1-4 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system according to invention principles is usable wherever it is desirable to use hands free voice commands and roam from device to device but return to a previous image page or location within an executable application. Further, any of the functions provided by system 100 and the application 17 script procedure of FIG. 1 may be implemented in hardware, software or a combination of both and may reside on one or more processing devices located at any location of a network linking the FIG. 1 elements or another linked network including another intra-net or the Internet.

What is claimed is:

1. A system for managing user operation sessions on a plurality of servers, comprising:
   an interface for receiving, from a first workstation, a request to initiate a current session of operation of a particular executable application on a first server and user identification information from a particular user; and
   a session processor for, in response to the received particular user identification information,
      initiating a search of session tracking information for a plurality of different servers including first and second servers,
      identifying in response to the search an active session of operation of said particular user on the second server previously initiated via a second workstation
      detaching of the previously initiated active session of operation with said second server from said second workstation and
      re-attaching connection of said first server to said first workstation as said current session in response to a user voice command, and
      terminating sessions of operation that are associated with the user and are present on said plurality of different servers, other than the re-attached detached current session of operation.

2. A system according to claim 1, wherein
said session processor re-attaches connection of said previously initiated active session of operation to said first workstation as said current session without requiring re-authentication of said particular user identification information.

3. A system according to claim 1, wherein
said session tracking information for said plurality of different servers is maintained on at least one of, (a) said first server and (b) distributed among said plurality of different servers and
said request to initiate a current session of operation is generated in response to wireless detection of a remote tag within a predetermined proximity of said first workstation.

4. A system for managing user operation sessions on a server, comprising:
   an interface for receiving, from a first workstation, a request to initiate a current session of operation of a particular executable application on a first server and user identification information from a particular user; and
   a session processor for, in response to the received particular user identification information,
      initiating a search of session tracking information for a plurality of different servers including the first server,
      identifying in response to the search an active session of operation of said particular user on said first server previously initiated via a second workstation,
      detaching connection of the identified previously initiated active session of operation to said second workstation,
      re-attaching connection of the detached previously initiated active session of operation to said first workstation as said current session in response to a voice command of said particular user, and
      terminating sessions of operation that are associated with the user and are present on said plurality of different servers, other than the re-attached detached current session of operation.

5. A system according to claim 4, wherein
said voice command of said particular user identifies said first workstation.

6. A system according to claim 4, wherein
said voice command of said particular user identifies said particular user.

7. A system according to claim 4, wherein
said step of re-attaching connection comprises at least one of, (a) enabling a communication link, (b) establishing an association or mapping supporting communication and (c) establishing a link supporting communication.

8. A system according to claim 4, wherein
said first and second workstations are different workstations and
said session processor re-attaches connection of said current session to said detached previously initiated active session of operation of an executable application at a position in said executable application where said particular user discontinued using said executable application.

9. A system according to claim 4, wherein
a session of operation comprises at least one of, (a) a session of operation of an executable application and (b) a session of operation of a processing device.

10. A system according to claim 9, wherein
said session of operation of a processing device comprises at least one of, (i) a session of operation of a workstation and (ii) a session of operation of a server.

11. A system according to claim 4, wherein
said session processor detaches connection of said identified previously initiated active session of operation to said second workstation without user performance of a second workstation logout function.

12. A system according to claim 4, wherein
said session processor identifies said active session of operation on said first server by acquiring information indicating operation sessions still present on said first server and associated with said user identification information from said particular user.

13. A system according to claim 4, wherein
said session processor acquires status information indicating operation sessions still present on said first server by interrogating session operation history information on said first server.

14. A system according to claim 4, wherein
said session processor terminates sessions of operation, associated with said particular user on said first server, other than said re-attached detached previously initiated active session.

15. A method for managing user operation sessions on a server, comprising the activities of:
employing at least one processing device for, receiving, from a first workstation, a request to initiate a current session of operation of a particular executable application on a first server and user identification information from a particular user; and in response to the received particular user identification information, initiating a search of session tracking information for a plurality of different servers including first and second servers, identifying an active session of operation of said particular user on said first server previously initiated via a second workstation, detaching connection of the identified previously initiated active session of operation to said second workstation re-attaching connection of the detached previously initiated active session of operation to said first workstation as said current session in response to a voice command of said particular user, and terminating sessions of operation that are associated with the user and are present on said plurality of different servers, other than the re-attached detached current session of operation.

* * * * *